(12) United States Patent
Meyer et al.

(10) Patent No.: US 8,447,681 B2
(45) Date of Patent: May 21, 2013

(54) SYSTEM AND METHOD FOR ADMINISTERING A DESTINATION FUND HAVING AN ASSOCIATED GUARANTEE

(75) Inventors: Vernon Meyer, East Longmeadow, MA (US); Deborah Schunder, West Hartford, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 655 days.

(21) Appl. No.: 12/491,562

(22) Filed: Jun. 25, 2009

(65) Prior Publication Data

US 2010/0131423 A1     May 27, 2010

Related U.S. Application Data

(60) Provisional application No. 61/116,775, filed on Nov. 21, 2008.

(51) Int. Cl.
*G06Q 40/06*     (2012.01)

(52) U.S. Cl.
USPC .............. 705/36; 705/35; 705/37; 705/38; 705/39; 705/313; 705/44; 705/26.1

(58) Field of Classification Search
USPC .............. 705/26.1, 35–38, 80, 39, 313, 44
See application file for complete search history.

(56) References Cited

U.S. PATENT DOCUMENTS

| | | | | |
|---|---|---|---|---|
| 7,028,007 B1 * | 4/2006 | Abrahams et al. | | 705/38 |
| 7,444,300 B1 * | 10/2008 | Broms et al. | | 705/35 |
| 7,689,501 B1 * | 3/2010 | Gastineau et al. | | 705/37 |
| 7,698,201 B2 * | 4/2010 | Carlson et al. | | 705/36 R |
| 7,747,502 B2 * | 6/2010 | Arnott et al. | | 705/36 R |
| 7,848,987 B2 * | 12/2010 | Haig | | 705/36 R |
| 2002/0174045 A1 * | 11/2002 | Arena et al. | | 705/36 |
| 2002/0194098 A1 * | 12/2002 | Stiff et al. | | 705/36 |
| 2003/0065596 A1 * | 4/2003 | Garbin et al. | | 705/35 |
| 2003/0191705 A1 * | 10/2003 | Miyata et al. | | 705/36 |
| 2004/0054612 A1 * | 3/2004 | Ocampo | | 705/36 |
| 2005/0092824 A1 * | 5/2005 | Hindermeyer et al. | | 235/375 |
| 2007/0011063 A1 | 1/2007 | Shelon et al. | | |
| 2007/0112662 A1 * | 5/2007 | Kumar | | 705/36 R |
| 2007/0299786 A1 * | 12/2007 | Bregstein et al. | | 705/36 R |
| 2008/0065522 A1 * | 3/2008 | Diffenderffer | | 705/36 R |
| 2008/0065561 A1 * | 3/2008 | Ethridge et al. | | 705/36 R |
| 2008/0077519 A1 | 3/2008 | Pedersen et al. | | |

(Continued)

OTHER PUBLICATIONS

A Retirement Plan Decision Model for Small Business: Abstract; Todd, Jerry D; Journal of Risk and Insurance (pre-1986); Jun. 1984; 51, 2; ProQuest Central, p. 265.*

(Continued)

*Primary Examiner* — Tien Nguyen
(74) *Attorney, Agent, or Firm* — Howard IP Law Group, PC

(57) ABSTRACT

A system is provided for administering a destination fund having a guarantee wrapper. The guarantee provides an income stream for life to one or more investors. The destination fund has a selected mix of equities and fixed income investments to provide for enhanced returns throughout retirement for the investor. The destination fund additionally provides income stream flexibility throughout the lifetime of the investor. Administration of a destination fund having a guarantee wrapper may include initiating a guarantee payment process if a value of the destination fund falls below a threshold.

24 Claims, 9 Drawing Sheets

U.S. PATENT DOCUMENTS

2008/0162373 A1* 7/2008 Adler et al. ............... 705/36 R
2009/0089218 A1* 4/2009 McCullough ............. 705/36 R
2010/0121779 A1* 5/2010 Castineiras et al. ....... 705/36 R

OTHER PUBLICATIONS

Scism, L., "Insurance to Protect 401(k)s: The Trick Is to Figure Out How", The Wall Street Journal, May 4, 2009, p. R-7.

DWS LifeCompass Income Fund, Supplement to the Currently Effective Prospectuses, filed Jun. 6, 2008, DWS Scudder Distributors, Inc., Jun. 2008.

Allstate Financial Investment Trust, Allstate ClearTarget 2005 Retirement Fund; Allstate ClearTarget 2010 Retirement Fund, Allstate ClearTarget 2015 Retirement Fund, Allstate ClearTarget 2020 Retirement Fund, Allstate ClearTarget 2030 Retirement Fund, Allstate ClearTarget 2040 Retirement Fund, Allstate ClearTarget 2050 Retirement Fund; SEC Form 497; Filed: Apr. 16, 2008.

Form S-3, Allstate Life Insurance Company; The Allstate(R) Guaranteed Lifetime Income Annuity; Filed: Apr. 15, 2008.

* cited by examiner

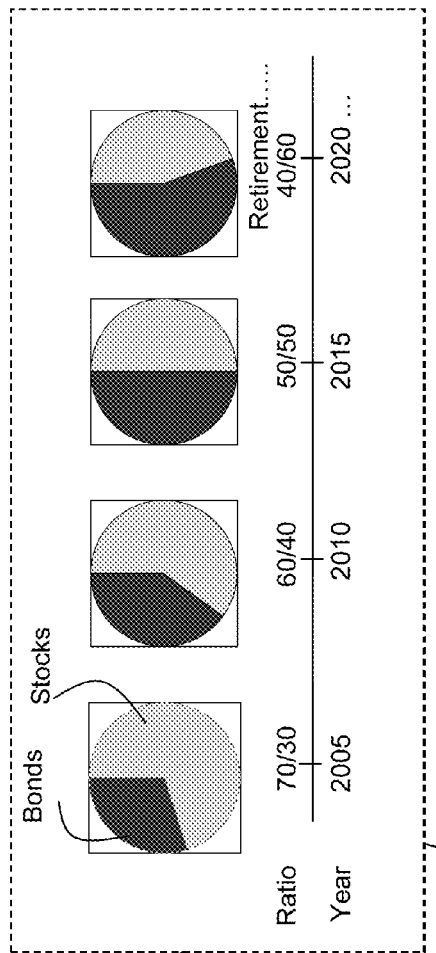
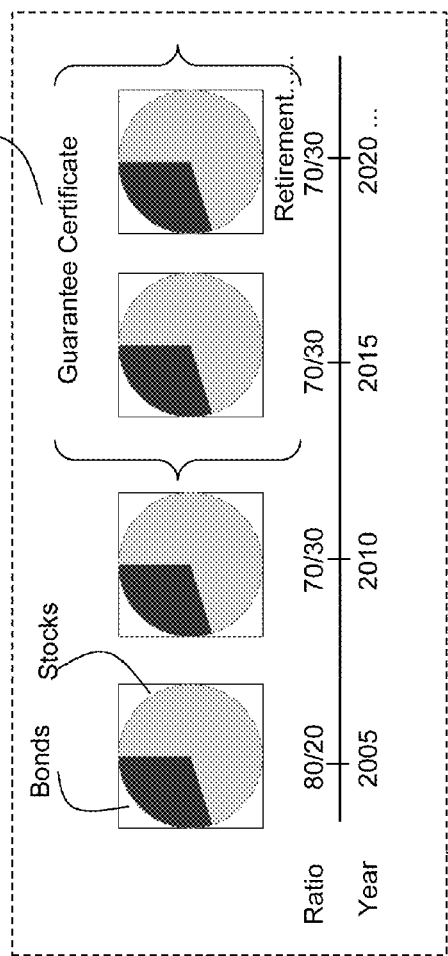
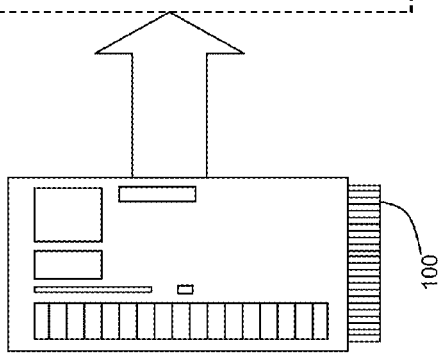
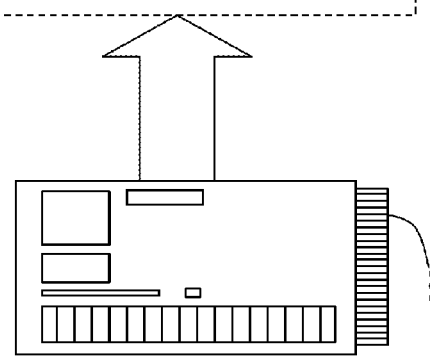
FIG. 1 (Prior Art)
FIG. 2

SYSTEM AND METHOD FOR ADMINISTERING A DESTINATION FUND HAVING AN ASSOCIATED GUARANTEE

RELATED APPLICATIONS

This application claims the benefit of U.S. Provisional Patent Application Ser. No. 61/116,775, filed Nov. 21, 2008, the entire disclosure of which is incorporated by reference herein.

BACKGROUND

Previously, consumers who invested for retirement had to manually update and re-allocate their portfolios as they aged. This proved to be very cumbersome for individual investors and thus target date funds were developed. Target date funds provide investors with an efficient and easy way to invest for their retirement. Target date funds relieve consumers of the need to constantly monitor investment portfolios and manually manage asset allocations since these tasks are performed automatically for the investor. Many of these target date funds are offered through employer-sponsored 401(k) or IRAs through which employee investors can find the appropriate target date fund that matches their respective anticipated retirement dates.

Target date funds help eliminate the confusion many employees and investors experience when faced with too many mutual fund choices in their typical 401(k) offerings. Generally, a target date fund is comprised of a predetermined mix of cash, bonds and stocks which changes as the investor ages. The target date fund's name generally includes the retirement year, and the funds are usually spaced at five years increments (e.g., 2010, 2015, 2020, 2025, etc.).

Target date funds provide automatic routine rebalancing of the investments held in the portfolio. As the investor ages, the investments are re-allocated towards a more conservative investment mix. The general theory is that as the retirement date approaches, the increasingly conservative asset mix will provide the necessary mix for security, stability and managed growth by progressively decreasing the fund's holding in more volatile equities.

Generally aggressive type target date funds have higher percentages of the portfolio allocated to stocks. The term "stock," as used therein, should be understood to include any equity instrument, including any exchange-traded equity instrument. These funds are also referred to based on their specific stock to fixed income (such as bonds, cash, etc.) ratio. For example, in a 40/60 mix, the particular fund will have 40-percent stocks and 60-percent fixed income holdings. Thus, a hypothetical target date fund may move from a progressively from a 70/30 mix, to a 60/40 mix, to a 50/50 mix and then to a 40/60 mix as the investor ages. In another example, an investor purchasing a target fund in 2010 would initially have 90% of the fund invested in stocks (more aggressive). In 2030, such a fund would be made up of 80% stocks, a slightly less aggressive approach. Last, in 2050, that fund will be close to 50% stocks and 50% bonds, an extremely conservative and secure approach but at the expense of quite a bit of potential return upside. Generally, the security of fixed income investments is preferred as the investor approaches retirement. As this conventional target date fund asset allocation progresses, the investor exchanges security for decreased upside since as the stock mix in the fund decreases, so does the potential for increased returns. This type of conservative investment allocation progression can negatively impact the size of the accumulated wealth which an investor can accumulate both pre-retirement and during retirement. Such wealth accumulation is necessary to provide regular income to fund essential living expenses such as food and housing costs, retirement activities and health care expenses which may increase as the investor ages.

Referring to FIG. 1, a prior art system for administering a conventional target date fund is shown. In the prior art, a computer or server 100 administers a target date fund 120 which is automatically configured to reallocate the asset mix of stocks and bonds according to a selected time frame that is appropriate for a particular investor's retirement plan. In the prior art, the ratio of stocks to bond held in the target fund is reallocated to proportionally reduce the stock or equity type holdings in relation to the bond holdings such as in the following order: 70/30; 60/40; 50/50 and 40/60. Generally, as the prior art investment allocation path or so called "investment glidepath" progresses and approaches the investor's anticipated retirement age, an ever increasing percentage of the holdings will be composed of non-equity or non stock related investments such as bonds, cash, etc. This strategy effectively reduces the volatility and short-term investment risks for the investor but sacrifices the greater returns expected of higher equity holdings and the associated larger nest eggs which could have been built up in the years approaching retirement.

SUMMARY OF THE INVENTION

In an embodiment, a computer system for administering a destination fund having a guarantee in an investment program includes a monitoring module for determining destination fund eligibility, the monitoring module being for receiving data relating to a plurality of investors, including, for each of the investors, time until retirement, an investment plan type of the investor; value of investments, and current allocation of investments of the investor; comparing the time until retirement for each investor to a predetermined threshold time until retirement; comparing the investment plan type to one or more qualified investment plan types; comparing the value of investments to a threshold minimum value of investments; if for one of the investors, the time until retirement is not more than the predetermined threshold time until retirement, the investment plan type is one of the qualified investment plan types, and the value of investments is not less than the threshold minimum value, the monitoring module determines that the investor is eligible for the destination fund and provides an output signal indicative of eligibility. The computer system further includes a fund initiation module for, in response to receipt of the output signal from the monitoring module, activating a destination fund for the investor, the activating step comprising divesting assets and reinvesting proceeds of the divested assets in the destination fund, wherein the destination fund has a predetermined ratio of equity and non-equity investments. The computer system further includes an administration module for accessing a predetermined threshold balance of the destination fund, comparing the predetermined threshold balance to a current balance, based on the result of the comparison determining whether one or more guarantee payments are to be made, and providing an output signal including data indicative of the one or more guarantee payments. A system may further include a payment system for, responsive to receiving the output signal including data indicative of one of the guarantee payments, effecting the guarantee payment to the recipient in accordance with the data in the output signal. In an embodiment, the payment system may effect payment by accessing payor account data and payee address data, and printing a mailing a check in accordance with the accessed data. In an embodiment, the payment system may effect payment by accessing payor account data and payee account data, and providing an output signal to a payor bank to effect an electronic funds transfer from a payor account to a payee account in accordance with the accessed data.

In an embodiment, a system for administering a destination fund having a guarantee in an investment program includes a fund initiation module for activating a destination fund account for the investor, the activating including investing in the destination fund, wherein the destination fund has a predetermined ratio of equity and non-equity investments; and an administration module for activating a guarantee for an account in the destination fund responsive to receipt of investor decision to commence withdrawals, accessing a predetermined threshold balance of the destination fund, comparing the predetermined threshold balance to an account value adjusted for excess withdrawals, based on the result of the comparison determining whether one or more guarantee payments are to be made, and providing an output signal including data indicative of the one or more guarantee payments. The system further includes a payment system for, responsive to receiving the output signal including data indicative of one of the guarantee payments, effecting the guarantee payment to a recipient in accordance with the data in the output signal.

In an embodiment, a computer implemented method for administering a destination fund having a guarantee in an investment program includes receiving by a processor data relating to investors; activating by the processor a destination fund account for each of the investors, the activating comprising providing by the processor instructions for investing assets, wherein the destination fund has a first predetermined ratio of equity and non-equity investments; providing by the processor instructions to change the ratio of equity and non-equity investments to a second predetermined ratio, the second predetermined ratio being more weighted toward non-equity investments than the first predetermined ratio; with respect to each of the accounts, storing by the processor in memory that a guarantee is applicable to the account; accessing by the processor from a memory device a predetermined threshold balance of the destination fund account in accordance with the guarantee; accessing by the processor from a shareholder database an account value of the destination fund account; comparing by the processor the predetermined threshold balance to the account value; determining by the processor based on the result of the comparison whether one or more guarantee payments in accordance with the guarantee are to be made, providing by the processor an output signal including data indicative of the one or more guarantee payments; receiving by a payment system the output signal and effecting by the payment system the payment.

In an embodiment, a system for administering a destination fund having a guarantee includes a communications component for collecting information related to one or more investors; a storage component for storing the investor information for investors having one or more target fund accounts, the target funds having a first predetermined ratio of equity and non-equity investments, and, after a time period, a second predetermined ratio equity and non-equity investments weighted more than the first ratio to non-equity investments; and a processor for accessing the stored investor information, determining destination fund eligibility and initializing destination fund accounts having a guarantee for eligible investors, the destination fund accounts being funded by proceeds of assets from the target date fund accounts, the processor further configured for accessing guarantee payment eligibility criteria and destination fund data, determining based on the guarantee payment eligibility criteria and the destination fund data, whether guarantee payments associated with the destination fund are to be processed, and processing the guarantee payments.

DETAILED DESCRIPTION OF THE DRAWINGS

The invention may be better understood from the following illustrative description with reference to the following drawings.

FIG. 1 is a block diagram depicting a prior art target date fund investment allocation system.

FIG. 2 is a block diagram depicting a destination fund investment allocation system of the present invention.

DESCRIPTION OF CERTAIN ILLUSTRATIVE EMBODIMENTS

Figure 3:
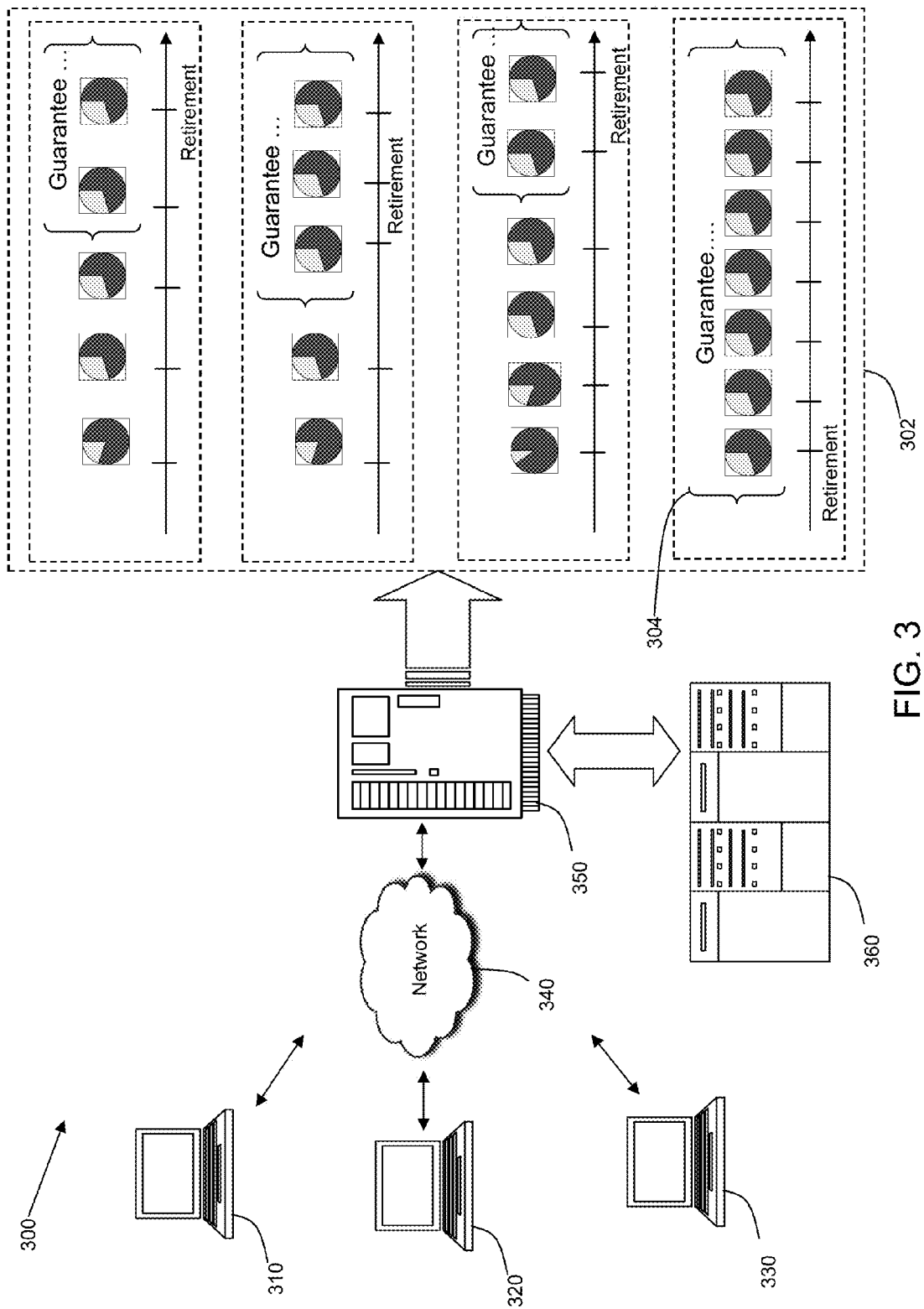
FIG. 3 is a block diagram of an exemplary computer system architecture suitable for implementing various computing devices for administering a destination fund of the present invention.

To provide an overall understanding of the invention, certain illustrative embodiments will now be described. However, it will be understood by one of ordinary skill in the art that the methods and systems described herein may be adapted and modified as is appropriate for the application being addressed and that the systems and methods described herein may be employed in other suitable applications, and that such other additions and modifications will not depart from the scope thereof. It is to be understood that the figures and descriptions of the present invention have been simplified to illustrate elements that are relevant for a clear understanding of the present invention, while eliminating, for the purpose of clarity, many other elements found in typical computer systems and methods for administration of investments and instruments, such as annuities, that may serve as guarantees. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein.

The inventors have appreciated that what is needed is a system for administering a retirement fund which provides investors with higher and more robust rates of return in their latter investment years for their retirement portfolios, as compared with target funds, but also provides the security of guaranteed income for those portfolios.

Referring now to FIG. 2, a system of the present invention for administering a destination fund with an associated guarantee is shown. In the embodiment of FIG. 2, server 200 is configured to administer a destination fund 220 which overcomes the shortcomings of prior art target date funds which provide diminished returns for years closely approaching and during retirement. In an embodiment of the present invention, an investor is provided with significant upside potential even as they approach retirement and throughout their retirement. Destination fund 220 includes an associated guarantee 230 which guarantees or warrantees an income stream for at least a period certain during an investor's retirement and preferably, for the investor's entire lifetime. As shown, destination fund 220 provides an equity/non-equity investment in a consistent mix of approximately 70% equities and 30 bonds, which alternatively could be in the range of 65/35 to 75/25 equity/non-equity mix to provide the investor with enhanced returns throughout their retirement years. The investor may be provided a choice between the ranges of, for example, 65/35 to 75/25 allocation profiles to choose from depending on their risk tolerances. In one embodiment, the destination fund is provided within a qualified investment program, such as a qualified retirement plan context, such as in a 401(k) plan, or may alternatively be provided as a standalone investment choice administered via server 200. In an embodiment, the invested funds of the investor may be automatically moved into the destination fund a selected time period, such as five years, prior to the projected retirement date of the investor. Alternatively, the invested funds of the investor may be automatically moved into the destination fund at a predetermined date or a predetermined age. In an implementation, a processor may be adapted to calculate a destination fund allocation profile including a mix of investment types for a destination fund determined responsive to input data including factors such as anticipated retirement date, current date, asset amounts, projected desired income, and investor risk tolerance. The processor may be adapted to prompt a user to input data including, by way of example, anticipated retirement date, current date, asset amounts, projected desired income, and investor risk tolerance. The processor may be adapted to prompt a user to select one of multiple available allocation profiles. The processor may execute instructions stored on a computer-readable medium stored in the form of an application program, which application program implements an algorithm for calculating an optimal mix of investment types based on factors such as the foregoing factors.

Referring now to FIG. 3, a schematic diagram of a client/agent server arrangement 300 for implementation of a method and system for processing and administering a destination fund 302 having an associated guarantee 304 in accordance with an embodiment of the invention is shown. In the arrangement 300 of FIG. 3, financial service client/agent devices 310, 320, and 330 are in communication via a network 340 with at least one financial services information technology server 350. Communications between the various devices may include information related to the establishment and/or administration of one or more destination funds having the associated guarantees. In one implementation, client/agent devices 310, 320 and 330 may be computer terminals or personal computers running an operating system such as Windows XP, Windows Vista, Apple OS, UNIX, LINUX, thin client devices, portable devices such as personal digital assistants (running the Palm OS, by way of example), cell phones, or other devices.

Client/agent devices 310, 320 and 330 may be operated, for example, by individual prospective contract purchasers, investors, broker dealers, agents or other financial advisors, or by personnel of an insurance or financial services provider. Network 340 may be or include the Internet, a corporate intranet, wireless and wired communications channels, or other subnetworks, network nodes or locations. As shown, destination fund 302 includes an associated guarantee 304 which may be an annuity certificate or embedded guarantee or warranty which provides an investor with a lifetime income stream during their retirement. Guarantee 304 may be in the form of an annuity type wrapper or other guarantee form which provides the investor with a guaranteed income stream should the underlying destination fund not be able to meet the income stream required by the investor. Guarantee 304 may be provided directly by the underlying destination fund provider or may be provided by one or more guaranteeing or warranting third parties. Fees for the guarantee are only charged to the investor upon purchase of the destination fund.

Figure 4:
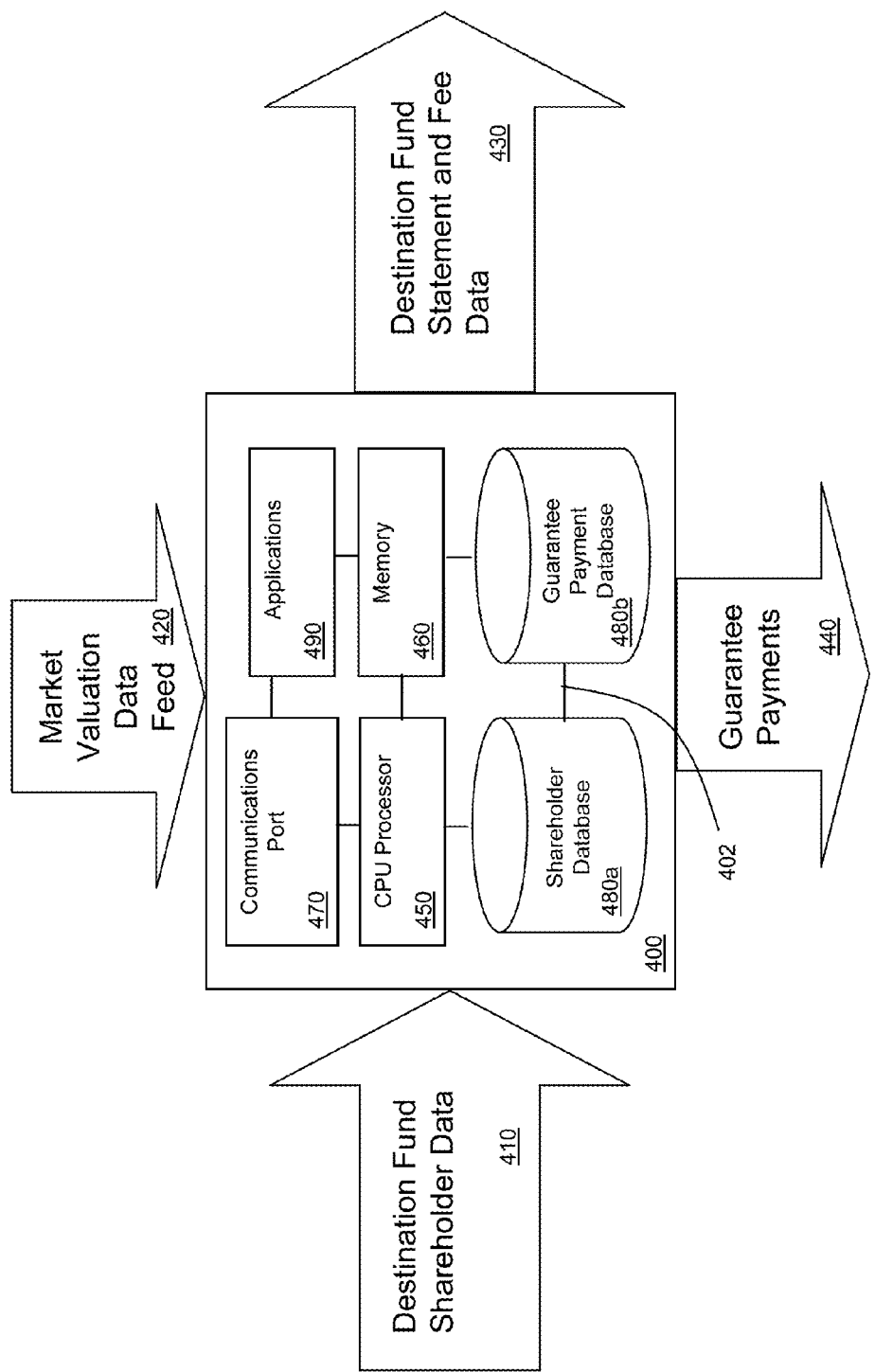
FIG. 4 is a functional block diagram of exemplary data flows for a system for processing transactions related to a destination fund of the present invention.

Referring to FIG. 4, an exemplary information flow diagram is shown for a destination fund management apparatus 400. Fund management apparatus 400 administers a number of information flows including a destination fund shareholder data flow 410, a market valuation data feed flow 420, a destination fund statement and fee data flow 430 and a guarantee payment information flow 440. In one exemplary embodiment, fund management apparatus 400 includes a bus 402 which connect a CPU (Central Processing Unit) 450, a memory 460 such as a RAM (Random Access Memory), and a ROM (Read-Only Memory) a communications port 470 and one or more databases 480*a* and 480*b*. Bus 402 has functions for connecting all of these devices, and is an internal path having address and data paths. CPU 450 is adapted for executing one or more application programs 490 for management and administration of the destination fund. Application programs 490 include instructions stored on a computer-readable medium and adapted for execution by a processor. Communications port 470 may be adapted to serve as a communications component for collecting investor information for purchase of one or more destination funds. Memory 460 may be adapted to serve as a storage component for storing the investor information. CPU 450, when executing instructions contained in application programs 490 may be adapted for determining eligibility for the one or more of the destination funds and for monitoring the destination funds for specific account or performance levels in order to determine if payment are required to be made under the associated guarantees.

Figure 5:
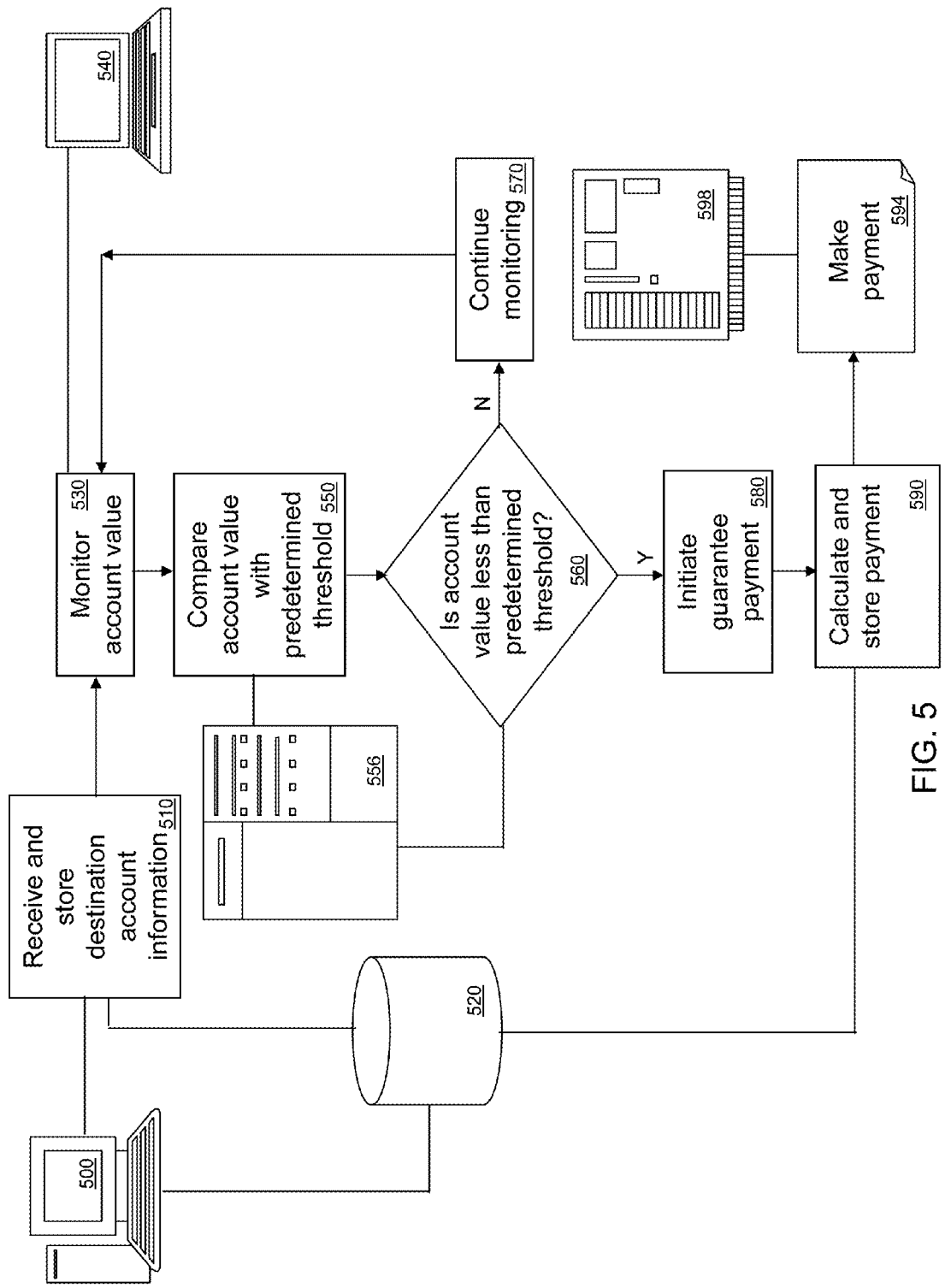
FIG. 5 is an exemplary computerized method for administering a destination fund of the present invention.

Referring now to FIG. 5, a flow diagram is shown depicting a computer implemented method for the processing and administration of a destination fund having an associated guarantee according to an illustrative embodiment of the invention. In one embodiment, a computer 500 is used to receive and store destination account information 510 utilizing at least one database 520. Once received and stored, the account is monitored for an account value 530 utilizing one or more other computers, terminals or servers, such as computer 540. The account value may be adjusted for excess withdrawals. Adjustment for excess withdrawals may include determining a maximum annual withdrawal from the account, accessing annual withdrawal data to determine if withdrawals in any annual period exceeded the maximum annual withdrawal, and adding the amount of the excess withdrawals to the account value to obtain an adjusted account value. The amount of the excess withdrawals may be adjusted, for example by determining interest on the excess withdrawals from the date of withdrawal until the present, either simple or compounded. The amount of the excess withdrawals may be adjusted by determining the value that the excess withdrawal amount would have had it been invested in the fund. The monitored account value, which may be a value adjusted for excess withdrawals, is compared with one or more threshold values 550 via a financial services mainframe or server 556. Server 556 then determines if the account value is less than the predetermined threshold 560. If not, monitoring is continued 570. If the account value is less than or equal to the threshold, a guarantee payment process is initiated 580. By way of example, the threshold may be a low number, such as zero or $1,000. A payment amount is calculated and stored 590 utilizing one or more databases 520 or a predetermined amount stored in one or more databases 520. Payment is then made to a designated party 594 via a payment server 598. The administration module may continue to provide output signals indicative of payments to be made at periodic intervals for the lifetime of the investor. If the destination fund was established to provide for retirement income for a couple, the administration module may continue to provide output signals indicative of payments to made at periodic intervals until the last to die of the couple.

In an embodiment of the present invention, the guarantee certificate or wrapper is utilized to determine the thresholds for payments and the corresponding payment amounts. For example, the guarantee certificate or wrapper may be established to provide a lifetime payment stream equal to a predetermined fraction per annum of the initial account value to the investor. For example, the guarantee wrapper or certificate may provide for payments per annum in the range of 1% to 10% of the initial account value to the investor. In an embodiment, the benefit base used for calculating the annual payments may be different from the initial account value. For example, the benefit base may be the account value at the time of retirement, or immediately prior to the first payment. The benefit base may be the maximum account value, or the maximum account value on an anniversary of the account. The benefit base may be an average account value of account values taken on a daily, weekly, monthly or other periodic basis over a time period, such as a time period from initiation of the account to the first payment from the account. In other embodiments, a specified monetary sum per annum or other period may also be specified. It is contemplated that the guaranteed payment may be varied in accordance with the needs of specific investors, such as to accommodate the varying needs of each specific retiree.

In an embodiment, the guarantee provided by the destination fund may be warranted by a third party pursuant to a warranty agreement between the fund and/or a manager of the fund and a third party. By way of example, a warranty agreement may be provided pursuant to which the third party provides a standby letter of credit up to a stated maximum amount to the fund. The third party may be required to make payments to the fund under the letter of credit if the net assets of the fund are not sufficient for the fund to meet its guaranteed payment obligations. The third party may be required to make payments to the fund or directly to an investor if the balance of an account is not sufficient to provide the guaranteed payment.

In an embodiment, a guarantee may be in the form of a certificate, which may be a contract between the investor and an issuer, which may be an insurance company, for example. The certificate may be a contingent deferred annuity. A contingent deferred annuity provides payments over the remaining life of an investor or other designated person, or until the last to survive of two designated persons, on the occurrence of a contingency. The contingency may be the unavailability of sufficient funds in the investor's account to provide the guaranteed payment. A certificate may be offered pursuant to a prospectus. The certificate may provide for payments based on a percentage of a benefit base. The benefit base under the certificate may be subject to a cap specified in the certificate. The certificate may provide that certain withdrawals will reduce the benefit base. For example, a certificate may provide that any withdrawal prior to a specified age of the investor or another annuitant, or prior to a specified date, or earlier than a certain time after establishment of the account and/or purchase of the certificate, will reduce the benefit base. The certificate may provide that withdrawals in excess of a maximum percentage of a benefit base in a certain year will reduce the benefit base. Such withdrawals may reduce the benefit base by the amount of the withdrawal. Such withdrawals may reduce the benefit base to a fraction of its prior value determined by multiplying the benefit base prior to the withdrawal by a fraction equal to the account value after the withdrawal to the account value prior to the withdrawal. The maximum percentage may be fixed in the certificate, or may depend on factors, such as the age of the annuitant or the younger of joint annuitants at the time of the first withdrawal. The maximum percentage may depend on whether there is a single annuitant or joint annuitants. The certificate may provide that the benefit base is initially equal to the account value upon purchase of the certificate. The certificate may provide that the benefit base is equal to the greatest account value on an anniversary of the account or of the certificate, prior to any withdrawals. The certificate may provide that the benefit base does not change after the first withdrawal.

The guarantee payments may be made to a recipient other than an investor or a surviving spouse or partner of an investor. For example, the destination fund may be established to provide for income for another recipient, such as another relative of an investor, and the guarantee payments may be made to such designated recipient.

Figure 6:
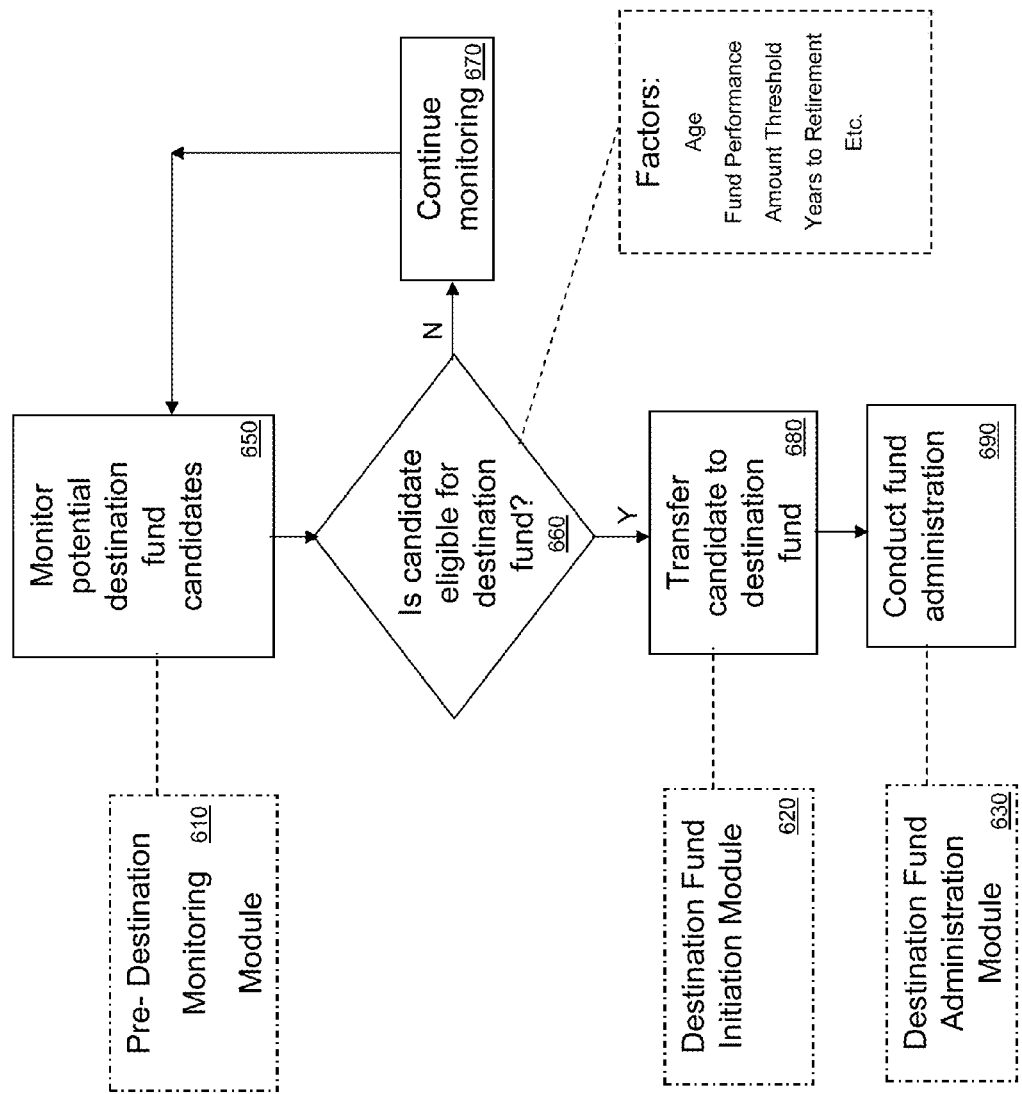
FIG. 6 is another exemplary computerized method for administering a destination fund of the present invention.

Referring now to FIG. 6, administration of the present invention may be accomplished using one or more configured modules such as a pre-destination monitoring module 610, a destination fund initiation module 620 and a destination fund administration module 630. In one exemplary embodiment, pre-destination monitoring module 610 monitors potential destination fund candidates 650 who may be certain pre-retirement investors holding conventional target date fund allocations. Pre-destination monitoring module 610 determines if the candidate is eligible for the destination fund 660. If not, the monitoring is continued 670. Eligibility may be determined from one or more factors such as determining how many years the candidate is before retirement or determining if the candidate is within a qualified investment plan for qualification for the destination fund. The pre-destination monitoring module 610 may access current time data and compare the current time data to eligibility criteria such as a date, age or other criteria. Other factors may include how well the investor's performance is determined to be in their current allocation or if their investor has a certain dollar amount invested. If the candidate is eligible for the destination fund, destination fund initiation module 620 activates one or more destination funds. Destination fund initiation module 620 may perform steps to transfer the candidate to the fund which may include selling their existing investment holdings and performing other administration steps to transfer the candidate to the destination fund. Once in the destination fund, destination fund administration module 630 performs one or more steps for the candidate including processing payments to be made under the associated guarantee. Destination fund administration module 630 may also perform steps such as monitoring the allocation of investments in the destination fund, comparing the current allocation to a desired allocation, and, in response to a change in the ratio of equity and non-equity investments, divesting assets in one category and reinvesting the proceeds of the divestment in assets in a different category, so as to maintain the investment allocation of the destination fund at the desired investment allocation or within a predetermined range, such as 1% to 5%, around the desired investment allocation.

Figure 7A:
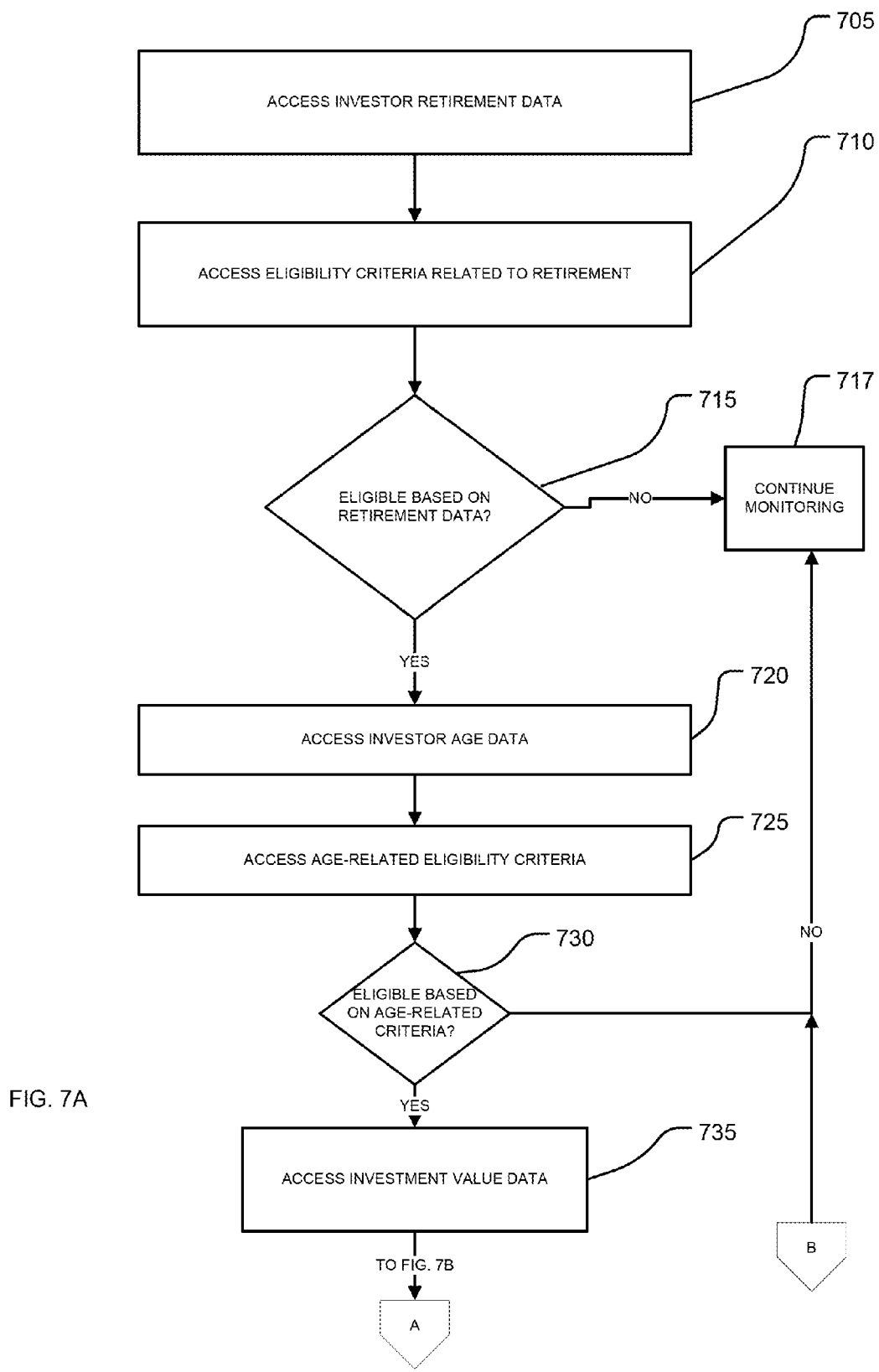
FIGS. 7A and 7B are a process flow diagram of an exemplary computerized process flow for monitoring investments for eligibility for a destination fund.
Figure 7B:
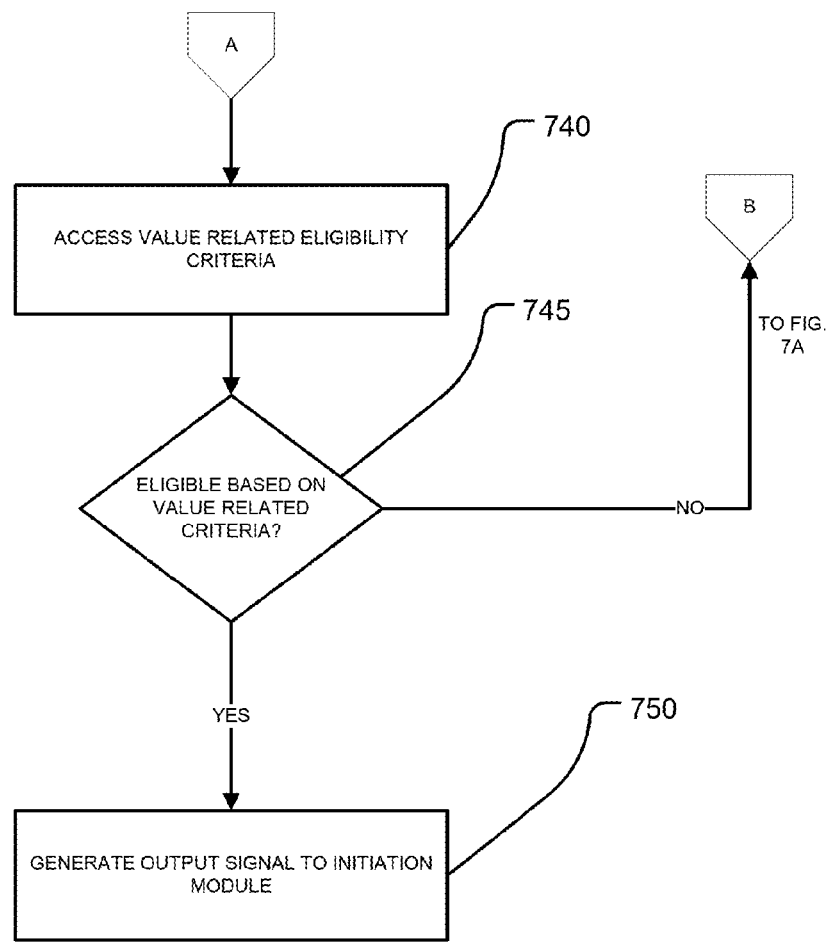

Referring to FIG. 7A, a process flow illustrating a process that may be implemented by pre-destination monitoring module 610 of FIG. 6, for example, is illustrated. In the embodiment of FIG. 7, a number of eligibility criteria must be met prior to the pre-destination monitoring module providing an output indicative of the investor being eligible for the destination fund. However, in an embodiment, fewer of the criteria, or different criteria, may be employed. The module may access 705 investor retirement data. Investor retirement data may include an anticipated date of retirement or an anticipated age of retirement. If the investments are held by a couple, the investor retirement data may include a date when both of the couple expect to retire, when one of the couple, generally the one with the greater wages, expects to retire, or a date intermediate the anticipated retirement dates of the couple. In an embodiment, an investor may establish a retirement age or date, and may later alter that age or date. The eligibility criteria may be accessed 710, and may include a minimum period of time, such as a period of years, prior to the anticipated age or date. The criteria may include threshold time data, such as a predetermined date, age or period of years prior to retirement. If the investor is determined by the module to not be eligible 715 according to the retirement date related criteria, then the investor may not be eligible, and the process flow may return to continuing to monitor 717. The process flow may continue with accessing 720 data relating to the investor's age. Data relating to the investor's age may include the ages of both members of a couple. The process flow may continue with the module accessing 725 age-related eligibility criteria. For example, a minimum age for an investor may be one of the age-related criteria. The age-related criteria may include separate age minima for both members of a couple. If the investor is not eligible 730 according to the age-related criteria, then the process flow may return to monitoring 717. If the investor is eligible according to the age-related criteria, the process flow may continue with the module accessing 735 investment value data. The investment value data may include dollar values, numbers of shares of securities, securities value data and other data from which a value may be determined. The process flow may continue with the module 740 accessing value-related criteria. The value-related criteria may include a minimum total value of investments, for example. If the investor is not eligible 745 according to the value-related criteria, then the process flow may return to monitoring 717. If the investor is eligible according to the value-related criteria, then the process flow may proceed to the module providing as an output a signal to activate the initiation module.

In an embodiment, the monitoring module may access data indicative of a current allocation of investments of an investor. For example, the current allocation data may indicate ratios of equity investments and non-equity investments to total investments of an individual investor. The monitoring module may access data indicative of criteria related to current allocation for initiation of the destination fund. In an embodiment, the criteria may provide for an investor's holdings to be transferred to a destination fund at an earlier age, or at a greater period of time prior to retirement, if the investor appears to have an excessively low percentage of investments in equities. For example, the criteria may include a threshold minimum percentage of equity holdings for investors within a certain age range or range of years until retirement. For example, the minimum percentage may be 60% of total investments in equities, and the age range may be 55 years to 60 years, or the range of years until retirement may be 5 to 10 years. If the criteria are met, the investor may be transferred into the destination fund, notwithstanding otherwise being below a minimum age threshold. In embodiments, the threshold percentage may vary, and the definition of the categories of holdings may vary. In embodiments, the time thresholds, such as age or time until retirement, may also vary.

Figure 8A:
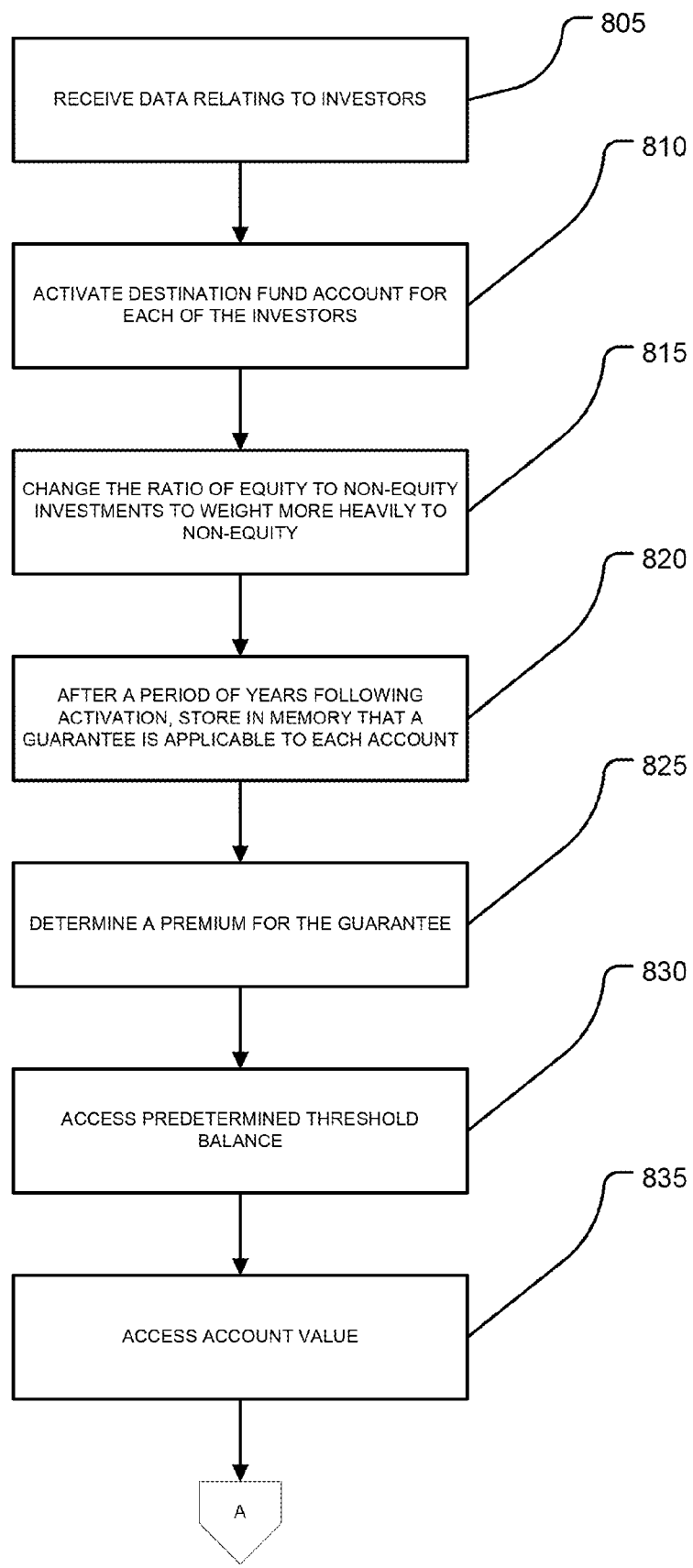
FIGS. 8A and 8B are a process flow diagram of an exemplary computerized method of administration of a destination fund.
Figure 8B:
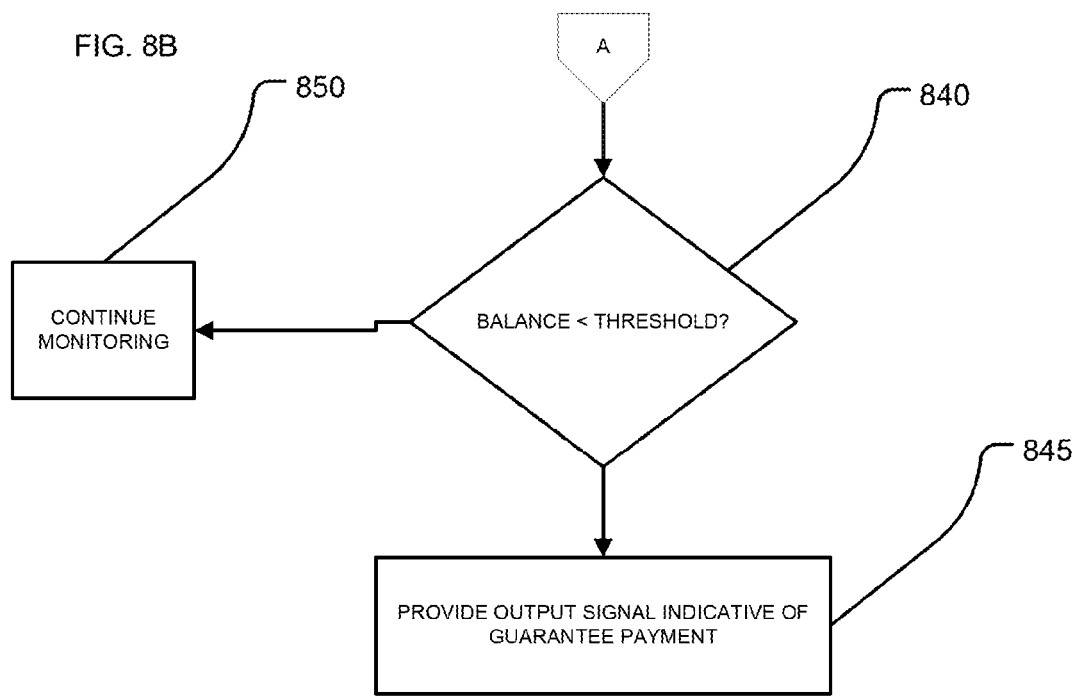

Referring to FIG. 8, in an embodiment, a process flow may include the following steps performed by an administration module. The steps may be performed by a computer system including a processor in communication with one or more memory devices and executing instructions stored in memory. The process flow may commence with receiving 805 data relating to investors. A destination fund account may be activated 810 for each of the investors. The activating may include providing instructions for investing assets, wherein the destination fund has a first predetermined ratio of equity and non-equity investments. Instructions may be provided 815 to change the ratio of equity and non-equity investments to a second predetermined ratio, the second predetermined ratio being more weighted toward non-equity investments than the first predetermined ratio. The change in the predetermined ratio may take place at a predetermined date, such as at predetermined time prior to the anticipated retirement date of the investor. Further changes in predetermined ratios may be made at further predetermined dates or predetermined intervals. Exemplary predetermined ratios are shown in FIGS. 2 and 3 and described above.

With respect to each of the accounts, after a period of time of at least about four years, and a period that may be 4, 5 or 6 years or a greater period, after activation of the account, a processor may store 820 in memory that a guarantee is applicable to the account. The guarantee may come into effect at a time which may be for example 5 years prior to the planned date of retirement or age of retirement of an investor, a predetermined age of the investor, or a predetermined date. The terms of such a guarantee may include those conditions discussed above. Various mechanisms to provide the guarantee may be provided, as discussed above.

With respect to each of the accounts, the process flow may include determining 825 whether the guarantee is applicable, and, responsive to determining that the guarantee is applicable, determining a premium for the guarantee. An output signal may be provided indicative of a premium amount to be deducted from the account. The premium may be a percentage of an asset value of the account calculated on a periodic basis, such as an annual basis. The premium may be deducted on the same period as the calculation, or may be deducted in fractional amounts, e.g., on a daily basis.

The flow may continue with accessing 830 from a memory device a predetermined threshold balance of the destination fund account. The balance may be predetermined in accordance with the guarantee. An account value of the destination fund account may be accessed 835 from a shareholder database. The predetermined threshold balance may be compared 840 to the account value. It may be determined based on the result of the comparison whether one or more guarantee payments in accordance with the guarantee are to be made. An output signal may be provided 845 including data indicative of the one or more guarantee payments. The signal may be provided to a payment fulfillment system. If the account value is at least as great as the threshold, the process flow may continue 850 monitoring the account value.

In an embodiment, a module may include one or more application programs, or one or more portions of one or more application programs, stored in a computer-readable medium and having instructions, which, when executed by a processor, cause the processor to execute the steps described as being performed by the module.

The process descriptions and flow charts contained herein should not be considered to imply a fixed order for performing process steps. Rather, process steps may be performed in any order that is practicable.

The present invention is operable with computer storage products or computer readable media that contain program code for causing a processor to perform the various computer-implemented operations. The computer-readable medium is any data storage device that can store data which can thereafter be read by a computer system such as a microprocessor. The media and program code may be those specially designed and constructed for the purposes of the present invention, or they may be of the kind well known to those of ordinary skill in the computer software arts. Examples of computer-readable media include, but are not limited to magnetic media such as hard disks, floppy disks, and magnetic tape; optical media such as CD-ROM disks; magneto-optical media; and specially configured hardware devices such as application-specific integrated circuits (ASICs), programmable logic devices (PLDs), and ROM and RAM devices. Examples of program code include both machine code, as produced, for example, by a compiler, or files containing higher-level code that may be executed using an interpreter. Steps in the computer-implemented methods may be implemented in processors running software stored locally, and/or in configurations such as application service providers, in which certain steps are executed on processors communicating with one another over a network such as the Internet. Either stand-alone computers or client/server systems, or any combination thereof, may be employed.

A system in accordance with the invention may include means corresponding to each step in each method described herein. Each means may be implemented by processor 110 executing instructions contained in programs which may be stored in a storage medium, such as local memory 120 or data storage 130. It will be appreciated that any of the steps in the methods in accordance with the invention described herein may be so implemented.

An exemplary advantage of a method and system in accordance with an embodiment is that the equity mix of the destination fund provides superior returns compared with a prior art target fund, while simultaneously providing the security of the guarantee certificate.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

We claim:

1. A system for administering a destination fund having a guarantee in an investment program, the system comprising:
   a monitoring module configured to determine destination fund eligibility, the monitoring module being configured to receive data including a value of investments relating to one or more investors, determining based on the received data whether the investor is eligible to participate in the destination fund, and responsive to a determination that the investor is eligible, providing an output signal indicative of eligibility;
   a fund initiation module configured to activate a destination fund account of the investor, the activating comprising investing in the destination fund, wherein the destination fund has a predetermined ratio of equity and non-equity investments;
   an administration module configured to activate a guarantee associated with an account in the destination fund responsive to receipt of investor decision to commence withdrawals, to access a predetermined threshold minimum balance of the destination fund account, to compare the predetermined threshold minimum balance to an account value adjusted in response to excess withdrawals, based on the result of the comparison to determine that one or more guarantee payments are to be made, to provide an output signal including data indicative of the one or more guarantee payments and to divest assets and to reinvest proceeds of the divested assets to maintain the destination fund within a predetermined range of a predetermined ratio of equity and non-equity investments, the ratio of equity investments exceeding the ratio of non-equity investments; and
   a payment system configured to, responsive to receiving the output signal including data indicative of one of the guarantee payments, effect the guarantee payment to a recipient in accordance with the data in the output signal,
   wherein the monitoring module is configured to compare current time data to a predetermined threshold age of the investor and to compare the value of investments to a threshold minimum value of investments,
   wherein the monitoring module is further configured to compare a current investor age to a first threshold age, responsive to determining that the current investor age is greater than the first threshold age, and responsive to determining that the value of assets meets the threshold minimum, to determine that the investor is eligible to participate in a destination fund, and
   responsive to determining that the current investor age is less than the first threshold age, comparing the current investor age to a second threshold age younger than the first threshold age and comparing a current ratio of equity to non-equity investments to a second threshold minimum ratio of equity investments to total investments, and, responsive to determining that the current investor age is greater than the second threshold age and that the current ratio of equity to non-equity investments is below the second threshold minimum ratio, determining that the investor is eligible to participate in the destination fund.

2. The system of claim 1, wherein the administration module is further configured to determine whether the guarantee is in effect.

3. The system of claim 2, wherein the administration module determines whether the guarantee is in effect based on whether the investor is within a predetermined period of time prior to retirement.

4. The system of claim 2, wherein the administration module is further configured to determine a premium amount charged associated with the guarantee, and to deduct the determined premium amount from a fund account commencing upon determining that the guarantee is in effect.

5. The system of claim 1, wherein the data received by the monitoring module includes associated with each of the investors an investment plan type of the investor, and wherein the monitoring module is configured to compare current time data to at least one of a threshold time until retirement and a predetermined threshold date.

6. The system of claim 5, wherein the monitoring module is further configured to compare the investment plan type to one or more qualified investment plan types, and to determine that the investor is eligible to participate in the destination fund only responsive to determining that the investment plan type is one or more of the qualified investment plan types.

7. The system of claim 6, wherein the one or more qualified investment plan types include 401(k) plans.

8. The system of claim 5, wherein the monitoring module is further for comparing a current equity to non-equity ratio of the investments to an age dependent threshold minimum equity to non-equity ratio.

9. The system of claim 1, wherein the administration module is further configured to determine the amount of the guarantee payments as a predetermined fraction of a benefit base.

10. The system of claim 9, wherein the benefit base is an initial value of the destination fund account.

11. The system of claim 1, wherein the fund initiation module is further configured to prompt a user to select one or more destination fund allocation profiles, wherein each allocation profile comprises ratios of each of equity and non-equity investments to total investments.

12. The system of claim 11, wherein the fund initiation module is further configured to prompt a user to provide investor risk tolerance data, and to determine an allocation profile responsive to received investor risk tolerance data.

13. The system of claim 1, wherein the guarantee payments are made pursuant to an annuity.

14. The system of claim 1, wherein the guarantee payments are made pursuant to a certificate.

15. The system of claim 1, wherein the predetermined ratio of equity and non-equity investments is in the range of from 65% equity and 35% non-equity to 75% equity and 25% non-equity.

16. The system of claim 1, wherein the second threshold age is 55, and the second threshold minimum ratio is 60% in equities.

17. A computer implemented method for administering a destination fund having a guarantee in an investment program, the method comprising:
receiving by a processor data relating to a plurality of investors including a value of investments associated with each of the investors;
determining based on the received data whether the investor is eligible to participate in the destination fund, and responsive to a determination that the investor is eligible, providing an output signal indicative of eligibility;
activating by the processor a destination fund account of each of the investors, the activating comprising providing by the processor instructions to invest assets, wherein the destination fund has a first predetermined ratio of equity and non-equity investments;
divesting assets and reinvesting proceeds of the divested assets to maintain the destination fund within a range of the first predetermined ratio of equity and non-equity investments;
storing by the processor in memory that a guarantee is applicable to the account;
accessing by the processor from a memory device a predetermined threshold minimum balance of the destination fund account in accordance with the guarantee;
accessing by the processor from a shareholder database an account value of the destination fund account;
comparing by the processor the predetermined threshold minimum balance to the account value;
determining by the processor based on the result of the comparison that one or more guarantee payments in accordance with the guarantee are to be made;
providing by the processor an output signal including data indicative of the one or more guarantee payments; and
receiving the output signal and effecting the payment by a payment system,
wherein the step of determining destination fund eligibility includes: comparing current time data to a predetermined threshold age of the investor, comparing the value of investments to a threshold minimum value of investments, comparing a current investor age to a first threshold age, responsive to determining that the current investor age is greater than the first threshold age, and responsive to determining that the value of assets meets the threshold minimum, determining that the investor is eligible to participate in a destination fund; and
responsive to determining that the current investor age is less than the first threshold age, comparing the current investor age to a second threshold age younger than the first threshold age and comparing a current ratio of equity to non-equity investments to a second threshold minimum ratio of equity investments to total investments, and, responsive to determining that the current investor age is greater than the second threshold age and that the current ratio of equity to non-equity investments is below the second threshold minimum ratio, determining that the investor is eligible to participate in the destination fund.

18. The method of claim 17, further comprising, prior to the step of activating, determining by the processor whether an investor account has been in effect for at least a predetermined period of time, wherein the step of activating is performed only responsive to determining that the investor account has been in effect for at least the predetermined period of time.

19. The method of claim 18, wherein the predetermined period of time is at least about two years.

20. The method of claim 17, further comprising, with respect to each of the investors, determining a premium for the guarantee, and providing an output signal indicative of a premium amount to be deducted from the account.

21. The method of claim 17, wherein the guarantee payments are in amounts equal to a predetermined fraction of a benefit base.

22. The method of claim 21, wherein the benefit base is a maximum account value on an account anniversary.

23. The method of claim 17, wherein the guarantee payments are in predetermined dollar amounts.

24. The method of claim 17, further comprising providing by the processor instructions to change the ratio of equity and non-equity investments to a second predetermined ratio, the second predetermined ratio being more weighted toward non-equity investments than the first predetermined ratio.

* * * * *